Patented Aug. 22, 1933

1,923,798

UNITED STATES PATENT OFFICE 1,923,798

CONDENSATION PRODUCT AND PROCESS OF MAKING SAME

Rona Robinson, Withington, near Manchester, England, assignor to the firm of The Clayton Aniline Company, Limited, Clayton-Manchester, England No Drawing. Application July 12, 1929, Serial No. 377,923, and in Great Britain July 20, 1928

4 Claims. (Cl. 260—130)

The present invention relates to the manufacture of new condensation products from amines and aldehydes which are particularly valuable in the manufacture of rubber. It comprises the new products, the method of producing same, the application thereof, as well as the rubber which has been vulcanized with the aid of these products.

It has been found that new products are obtained which are very valuable in the rubber industry, (for example as retarders of deterioration of rubber) by causing 2 molecular proportions of acetaldehyde to react, in the presence of an inert solvent, on 1 molecular proportion of $\alpha$-naphthylamine, and then heating the condensation product thus obtained with from about $\frac{1}{3}$ to about $\frac{1}{2}$ mol of another aromatic amine or amines, such as, for instance, dialkylaniline, $\alpha$- or $\beta$-naphthylamine, or still other bases, such as aniline, the toluidines, alkylated $\alpha$- or $\beta$-naphthylamines, phenylene-diamines, etc., to the point of complete fusion. The products thus produced show essentially increased anti-ageing properties in comparison with the products made by causing the aldehyde to react on a mixture of the bases used, provided that the amines in the second part of the reaction do not react more slowly with the aldehyde than the $\alpha$-naphthylamine itself. However, if bases are used which react considerably more slowly than the $\alpha$-naphthylamine, the two condensations may be combined in one operation. The application of the products in vulcanization is described below.

The following examples illustrate the invention, the parts being by weight:—

Example 1

88 parts of acetaldehyde are gradually added with good agitation to 143 parts of $\alpha$-naphthylamine dissolved in 110 parts of denaturated alcohol. The temperature rises and is kept at about 25° C. until all the aldehyde has been added and is then slowly raised to about 80° C. and kept at that degree for some hours. The product, a hard opaque, amber solid, is separated and dried, preferably at a low temperature.

Example 2

192 parts of the powdered condensation product obtained as per Example 1 are heated with 34 parts of diethylaniline at as low a temperature as possible (below 100° C.) until a homogeneous fused mass is obtained. The product of the reaction is a clear, brittle, resinous solid.

Example 3

190 parts of the same condensation product prescribed in Example 1 are mixed with 56.7 parts of powdered $\beta$-naphthylamine and the mixture fused until a homogeneous resin is obtained. The product of the reaction is a valuable antioxidant and is in this respect superior in its properties to the product made by condensing in alcohol the corresponding quantities of $\alpha$- and $\beta$- naphthylamine with the same amount of aldehyde, i. e. 2 molecular proportions to 1 molecular proportion of $\alpha$-naphthylamine.

Example 4

88 parts of acetaldehyde are gradually added at a temperature below 25° C. with good agitation to a mixture of 143 parts of $\alpha$-naphthylamine dissolved in 110 parts of denaturated alcohol and 34 parts of dimethylaniline.

When all the aldehyde has been added the mass is very slowly heated to about 80° C. and kept at that temperature for some time and then heated to about 100° C. to ensure a homogeneous mass. The opaque, fawn colored solid is separated and dried at a low temperature.

Example 5

One part of the product of Example 2 is added to the following rubber mix:—

| | Parts |
|---|---|
| Pale crepe rubber | 100 |
| Zinc oxide | 5 |
| Sulfur | 4 |
| Diphenylguanidine | 1 |
| Refined china clay | 35 | and the whole cured at a steam pressure of 50 lbs. to the square inch in the usual manner.

What I claim is:—

1. Process for the manufacture of new condensation products, consisting in heating 2 molecular proportions of acetaldehyde, in the presence of an inert solvent, with 1 molecular proportion of $\alpha$-naphthylamine, and then heating the condensation product thus produced with from about $\frac{1}{3}$ to about $\frac{1}{2}$ mol of other aromatic amines to the point of complete fusion.

2. Process for the manufacture of new condensation products, consisting in heating 2 molecular proportions of acetaldehyde, in the presence of an inert solvent, with 1 molecular proportion of $\alpha$-naphthylamine, and then heating the condensation product thus produced with from about ⅓ to about ½ mol of β-naphthylamine to the point of complete fusion.

3. The condensation products which are obtained by heating 2 molecular proportions of acetaldehyde, in the presence of an inert solvent, with 1 molecular proportion of α-naphthylamine, and then heating the condensation product thus produced with from about ⅓ to about ½ mol of other aromatic amines to the point of complete fusion, which products form resinous solids which are valuable anti-agers in the rubber industry.

4. The condensation products which are obtained by heating 2 molecular proportions of acetaldehyde, in the presence of an inert solvent, with 1 molecular proportion of α-naphthylamine, and then heating the condensation product thus produced with from about ⅓ to about ½ mol of β-naphthylamine to the point of complete fusion, which products form resinous solids which are valuable anti-agers in the rubber industry.

RONA ROBINSON.